(12) United States Patent
Jung

(10) Patent No.: US 8,934,206 B2
(45) Date of Patent: Jan. 13, 2015

(54) REMOTE SENSING CIRCUIT AND HIGH-POWER SUPPLY APPARATUS HAVING THE SAME

(75) Inventor: Jee-hoon Jung, Yongin-si (KR)

(73) Assignee: Samsung Electronics Co., Ltd., Suwon-Si (KR)

(\*) Notice: Subject to any disclaimer, the term of this patent is extended or adjusted under 35 U.S.C. 154(b) by 517 days.

(21) Appl. No.: 12/481,771

(22) Filed: Jun. 10, 2009

(65) Prior Publication Data

US 2010/0073835 A1 Mar. 25, 2010

(30) Foreign Application Priority Data

Sep. 23, 2008 (KR) .................. 10-2008-0093373

(51) Int. Cl.
*H02H 3/20* (2006.01)
*H02M 1/32* (2007.01)
*H02M 3/156* (2006.01)

(52) U.S. Cl.
CPC ............. *H02M 1/32* (2013.01); *H02M 3/156* (2013.01)
USPC ...................................... 361/91.1; 361/111

(58) Field of Classification Search
USPC ................................... 361/56, 91.1
See application file for complete search history.

(56) References Cited

U.S. PATENT DOCUMENTS

| | | | | | |
|---|---|---|---|---|---|
| 3,949,271 | A | * | 4/1976 | Nercessian | 361/56 |
| 5,806,522 | A | * | 9/1998 | Katims | 600/554 |
| 6,204,671 | B1 | * | 3/2001 | Katsuma | 324/678 |
| 6,909,621 | B2 | * | 6/2005 | Lee | 363/81 |
| 2008/0150486 | A1 | * | 6/2008 | Kuan-Ting et al. | 320/128 |

FOREIGN PATENT DOCUMENTS

JP 2008-046487 2/2008

OTHER PUBLICATIONS

Korean Office Action Issued on Sep. 25, 2012 in KR Patent Application No. 10-2008-0093373.
Korean Notice of Allowance dated Sep. 24, 2013 issued in KR Patent Application No. 10-2008-0093373.

\* cited by examiner

*Primary Examiner* — Rexford Barnie
*Assistant Examiner* — Tien Mai
(74) *Attorney, Agent, or Firm* — Staas & Halsey LLP

(57) ABSTRACT

A remote sensing circuit and a high-power supply apparatus having the remote sensing circuit. The high-power supply apparatus can include a feedback circuit to feedback power output from a high-power supply unit to an input terminal of the high-power supply apparatus. The remote sensing circuit can include a switching unit connected between an output terminal of the high-power generating unit and the feedback circuit of the high-power supply apparatus to open the connection in a normal status and to close the connection in an abnormal status, a load channel to connect the high-power generating unit and a load, and a remote sensing unit having one terminal commonly connected to the load and the load channel and another terminal commonly connected to the switching unit and the feedback circuit to sense power supplied to the load.

20 Claims, 3 Drawing Sheets

REMOTE SENSING CIRCUIT AND HIGH-POWER SUPPLY APPARATUS HAVING THE SAME

CROSS-REFERENCE TO RELATED APPLICATIONS

This application claims priority under 35 U.S.C. §119(a) from Korean Patent Application No. 10-2008-0093373, filed on Sep. 23, 2008, in the Korean Intellectual Property Office, the disclosure of which is incorporated herein in its entirety by reference.

BACKGROUND

1. Field of the Invention

The present general inventive concept relates to a high-power supply apparatus, and more particularly, to a remote sensing circuit of a high-power supply apparatus.

2. Description of the Related Art

The amount of output voltage reduction increases in a high-power supply apparatus due to a connector, a wire, a harness, and the like, in an output terminal of the high-power supply apparatus. In order to prevent this increase, the amount of output voltage reduction can be compensated for by using remote sensing technology. When the remote sensing technology is used and an open fault occurs at the output terminal of the high-power supply apparatus when measuring an output voltage at the output terminal, an output voltage may be excessively increased. Thus, in order to implement a protection function against an over voltage, the high-power supply apparatus includes a switching-mode power supply (SMPS) having its own feedback circuit. Even though, the remote sensing technology may implement the protection function against the over voltage, in a normal status, the remote sensing technology may vary an output voltage of the high-power supply apparatus according to a load.

SUMMARY

The present general inventive concept provides a remote sensing circuit that can protect a circuit from an over voltage due to a feedback open fault that occurs when remote sensing technology is used, that can prevent variation of an output voltage, and that has a protection function against output power overload.

The present general inventive concept also provides a high-power supply apparatus having the remote sensing circuit.

The present general inventive concept also provides an image forming apparatus including the high-power supply apparatus having the remote sensing circuit.

Additional embodiments of the present general inventive concept will be set forth in part in the description which follows and, in part, will be obvious from the description, or may be learned by practice of the general inventive concept.

According to an example embodiment of the present general inventive concept, there is provided a remote sensing circuit of a high-power supply apparatus including a feedback circuit to feedback power output from a high-power generating unit to an input terminal of the high-power supply apparatus, the remote sensing circuit including a switching unit connected between an output terminal of the high-power generating unit and the feedback circuit of the high-power supply apparatus to open the connection in a normal status and to close the connection in an abnormal status, a load channel to connect the high-power generating unit to a load, and a remote sensing unit having one terminal commonly connected to the load and the load channel, and another terminal commonly connected to the switching unit and the feedback circuit, to sense power supplied to the load.

According to another example embodiment of the present general inventive concept, there is provided a high-power supply apparatus including a high power generating unit, a feedback circuit unit to feedback power output from the high power generating unit to an input terminal of the high-power supply apparatus, a switching unit connected between an output terminal of the high power generating unit and the feedback circuit unit to open the connection in a normal status and to close the connection in an abnormal status, a load channel to connect the high-power supply apparatus to a load, and a remote sensing unit having one terminal commonly connected to the load and the load channel and another terminal end commonly connected to the switching unit and the feedback circuit unit, to sense power supplied to the load.

According to another example embodiment of the present general inventive concept, there is provided an image forming apparatus including an image forming unit to form an image, and a high-power supply apparatus to supply high power to the image forming unit, wherein the high-power supply apparatus includes a high power generating unit, a feedback circuit unit to feedback power output from the high power generating unit to an input terminal of the high-power supply apparatus, a switching unit connected between an output terminal of the high power generating unit and the feedback circuit unit to open the connection in a normal status and to close the connection in an abnormal status, a load channel to connect the high-power supply apparatus to a load, and a remote sensing unit having one terminal commonly connected to the load and the load channel and another terminal commonly connected to the switching unit and the feedback circuit unit to sense power supplied to the load.

Yet another example embodiment of the present general inventive concept can provide an electronic device having a power supply to supply power to the electronic device and a sensing circuit to control an over voltage of the power supply, the sensing circuit including a switching unit connected between an output terminal of the power supply and a feedback input of the power supply to selectively open and close a first connection between the output terminal and the feedback input, and a sensing unit having one terminal connected to a load channel of the power supply and another terminal connected to the feedback input of the power supply to sense the power supplied to the load channel, wherein when an output voltage of the load channel exceeds a predetermined threshold value, the switching unit closes the first connection to reduce the amount of current flowing through the load channel.

The switching unit can close the first connection when an impedance of the sensing unit exceeds a predetermined threshold value.

The switching unit can close the first connection when the current flowing through the feedback input of the power supply exceeds a predetermined value.

The switching unit may include a BJT (bipolar junction transistor) which is enabled when a voltage of the another terminal is lower than a voltage $V_{CE}$ of the BJT.

Yet another example embodiment of the present general inventive concept can provide a method of sensing an over voltage of a power supply, the method including sensing an output voltage of a load channel of the power supply, and switching a connection between an output terminal of the power supply and a feedback input of the power supply to reduce the amount of current flowing through the load channel.

BRIEF DESCRIPTION OF THE DRAWINGS

These and/or other embodiments of the present general inventive concept will become apparent and more readily appreciated from the following description of the embodiments taken in conjunction with the accompanying drawings of which:

FIG. 3 is a diagram of a feedback circuit of the high-power supply apparatus having the remote sensing circuit, according to another embodiment of the present general inventive concept; and.

DETAILED DESCRIPTION OF THE EMBODIMENTS

Figure 1:
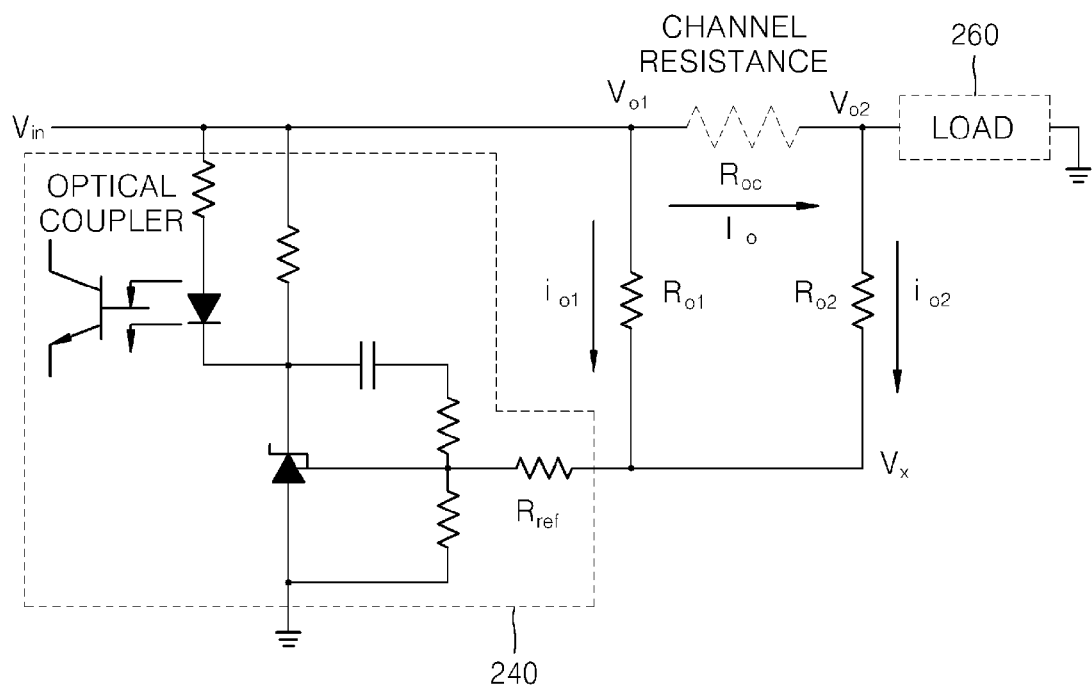
FIG. 1 is a diagram of a general remote sensing circuit.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a diagram of a general remote sensing circuit. The remote sensing of a remote sensing circuit is related to remote sensing technology that involves sensing a voltage at an input terminal ($V_{o2}$) of a load being supplied with an output power of the remote sensing circuit. The remote sensing circuit is thus able to control the output voltage of a high-power supply apparatus which supplies power ($V_{in}$) to the remote sensing circuit to compensate for an amount of output voltage reduction that can occur at the load due to the resistance $R_{OC}$ of a connector and a cable which connect the output terminal of the high-power supply apparatus to the input terminal ($V_{o2}$) of the load. In this manner, when an output voltage sensing terminal at ($V_{o2}$) of the remote sensing circuit is closed to the load, the voltage ($V_{o2}$) at an input terminal of the load may be controlled to be a constant voltage, and the voltage ($V_{o2}$) at the input terminal of the load can be changed based on the load current. The remote sensing circuit also typically includes a feedback circuit unit 240 including an optical coupler, capacitor, diode, and resistor arrangement to feedback power from the remote sensing circuit to the power supply (not illustrated), although other known or later developed feedback circuit units may be used without departing from the principles of the present general inventive concept. Thus, the remote sensing circuit technology can be generally applied to a power supply apparatus having relatively large output current.

In the case where a remote sensing terminal at $V_{o2}$ is open in the general remote sensing circuit due to various reasons, a control unit of the power supply apparatus may not recognize information about an output voltage ($V_{o2}$). Thus, when the remote sensing terminal at $V_{o2}$ is open, the information about the output voltage ($V_{o2}$) may be generally recognized as 0 V. At this time, a Pulse Width Modulation (PWM) controller may set a duty cycle to have a maximum value so as to control the output voltage ($V_{o2}$) according to a predetermined reference value. By doing so, an output voltage ($V_{o2}$) at the output terminal may be excessively increased such that not only the power supply apparatus but also a load circuit may be damaged due to this excessive over voltage. In order to prevent this damage, a protection circuit resistor $R_{o1}$ can be connected so that the output voltage $V_{o2}$ may be constantly controlled at a predetermined level even when a remote sensing resistor $R_{o2}$ is open.

However, the protection circuit resistor $R_{o1}$ may cause an error $V_{err}$, in controlling the output voltage when the power supply apparatus operates in a normal status as defined by Equation 1 below:

$$V_{err} = V_{o2} - V_x = R_{o1} i_{o1} - R_{OC} I_O \quad \text{Equation 1}$$

where, the error $V_{err}$ may include a voltage across the protection circuit resistor $R_{o1}$, and a voltage across an output load. Thus, the remote sensing technology, which aims to minimize a constant voltage control error due to the output load, may generate the output voltage control error due to an output load by an over voltage protection circuit. At this time, the magnitude of an error caused by the protection circuit resistor $R_{o1}$ may be smaller than an error that occurs when the remote sensing technology is not used.

Figure 2:
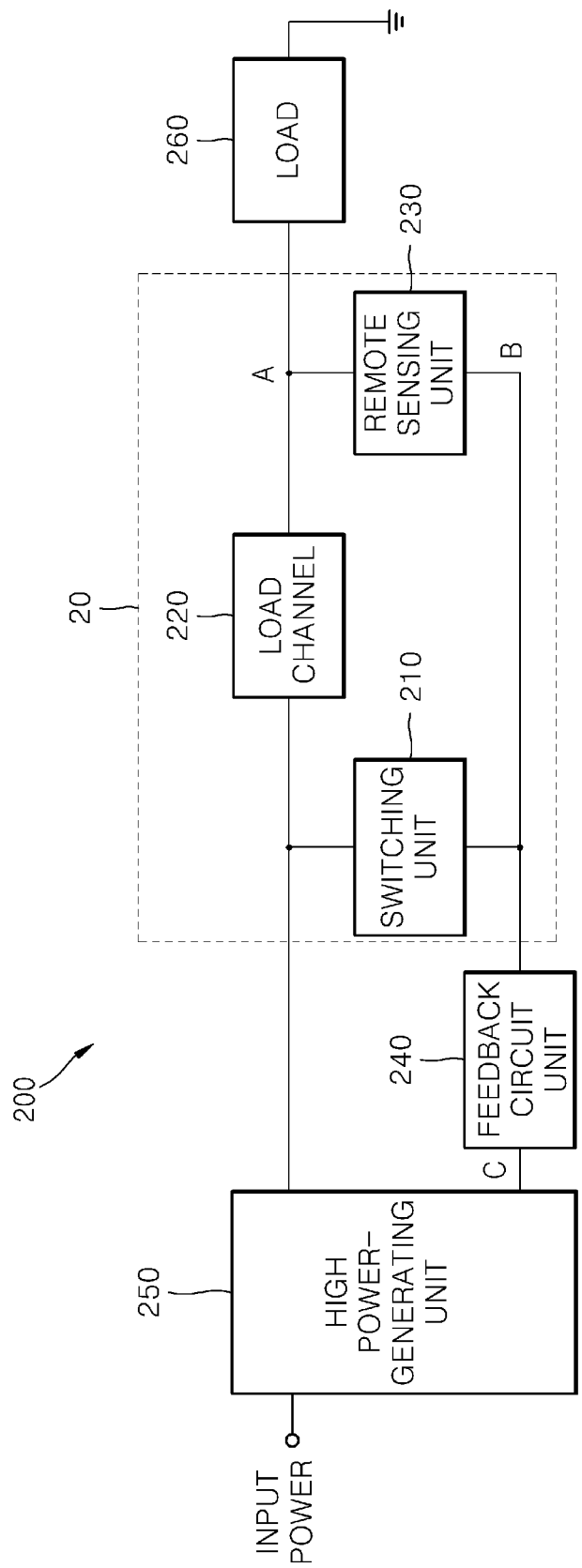
FIG. 2 is a block diagram of a remote sensing circuit and a high-power supply apparatus having the remote sensing circuit, according to an embodiment of the present general inventive concept.

FIG. 2 is a block diagram of a remote sensing circuit 20 connected to a high-power supply apparatus 200 having the remote sensing circuit 20, according to an embodiment of the present general inventive concept. The remote sensing circuit 20 according to the embodiment of FIG. 2 may include a switching unit 210, a load channel 220, and a remote sensing unit 230. The high-power supply apparatus 200 can include the remote sensing circuit 20, a high power-generating unit 250, and a feedback circuit unit 240.

As illustrated in FIG. 2, the switching unit 210 can be connected between an output terminal of the high-power generating unit 250 and the feedback circuit unit 240 of the high-power supply apparatus 200. In a normal status, the switching unit 210 can open this serial connection, and in an abnormal status, the switching unit 210 can close this serial connection. A bipolar junction transistor (BJT) may be used as the switching unit 210, but the present general inventive concept is not limited thereto. For example the switching unit 210 may include a general switching device such as a field-effect transistor (FET).

The load channel 220 may be a connector, a cable, or the like to connect the high-power supply apparatus to a load 260. Note that the load channel 220 can have its own resistance.

Referring to FIG. 2, one terminal A of the remote sensing unit 230 may be commonly connected to the load 260 and the load channel 220 and the other terminal B of the remote sensing unit 230 may be commonly connected to the switching unit 210 and the feedback circuit unit 240. The remote sensing unit 230 can then function to remotely sense power supplied to the load 260.

The high power-generating unit 250 can generate high power by using a voltage input to the high power-generating unit 250. That is, the high power generating unit 250 can generate a high voltage output by using a low voltage input.

The feedback circuit unit 240 can feedback power output from the high power-generating unit 250 to an input terminal C of the high-power supply apparatus.

Figure 3:
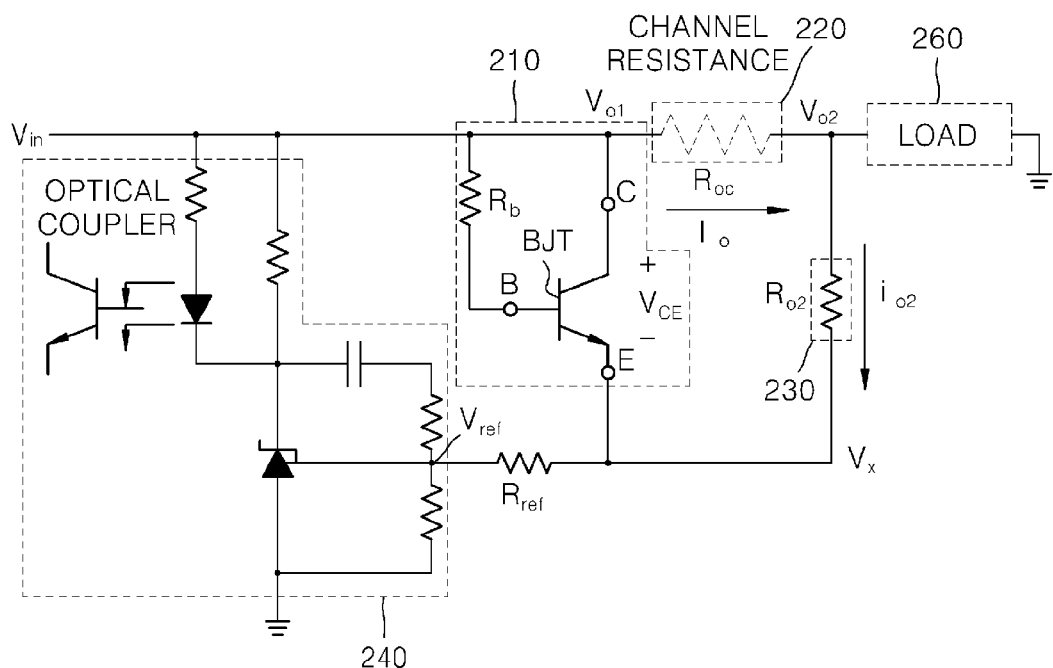

FIG. 3 is a diagram of a feedback circuit of the high-power supply apparatus having the remote sensing circuit 20, according to another embodiment of the present general inventive concept. By adding a switching device such as a BJT transistor to the feedback circuit of the general high-power supply apparatus, it is possible to enable a protection circuit to be selectively operated only when the remote sensing circuit (channel) is open, whereby the accuracy of the high-power supply apparatus in controlling a voltage $V_{o2}$ to be constant may be enhanced in a normal status, and in addition, a protection operation against an overload may be performed.

As illustrated in FIG. 3, the switching unit 210 (hereinafter, referred to as a protection circuit 210) can function as a switch. That is, when the remote sensing channel is open, the BJT switch can be turned on to selectively operate the protection circuit 210 such that the accuracy of the high-power supply apparatus in controlling the voltage to be constant can be improved. In addition, when over-current flows through an output terminal of the protection circuit 210 to cause an overload, and a voltage difference between $V_{o1}$ and $V_{o2}$ exceeds a predetermined voltage, the BJT switch may operate to perform the protection operation against the overload.

For example the feedback circuit of the high-power supply apparatus having the remote sensing circuit 20 can operate in the following manner. In the case where a remote sensing feedback channel is open and an equivalent resistance $R_{o2}$ has a high impedance, a voltage $V_x$ becomes substantially lower than a voltage $V_{o1}$. When the voltage $V_x$ becomes lower than a voltage $V_{CE}$, current flows through a resistor Rb so that a BJT is turned on and the voltage $V_x$ has a value calculated by using Equation 2.

$$V_x = V_{o1} - V_{CE} \qquad \text{Equation 2}$$

Thus, an output voltage can be limited to the sum total of the voltage $V_{o1}$+the voltage $V_{CE}$, and although an over voltage may be generated when the remote sensing feedback channel is open, it may be possible to prevent the over voltage.

In the normal status, since the voltage $V_{CE}$ is not higher than a threshold voltage of the BJT, the BJT is not turned on. At this time, the current flowing through a collector-emitter terminal may be ignored since the current is significantly low. A remote sensing feedback voltage error in the normal status may be calculated by using Equation 3.

$$V_{o2} - V_x = \frac{R_{o2}}{R_{ref} + R_{o2}}(V_{o2} - V_{ref}) \qquad \text{Equation 3}$$

where, $V_{ref}$ corresponds to a reference voltage at a terminal of the remote sensing feedback channel. As set forth in Equation 3, an output voltage error has no relationship with a load, and is only determined by a line-to-line resistor $R_{o2}$ of the terminal of the remote sensing feedback channel. Since this $R_{o2}$ is substantially smaller than $R_{ref}$ when the remote sensing circuit is used, the remote sensing feedback voltage error reaches almost 0 V. Thus, the accuracy of the high-power supply apparatus in controlling the constant voltage may be enhanced, compared to a conventional case in which the protection circuit 210 only includes resistors instead of the BJT.

Meanwhile, in the case where current excessively flows in the output terminal of the protection circuit 210 so that the voltage difference between $V_{o1}$ and $V_{o2}$ is greater than a threshold voltage at a collector-emitter terminal of the BJT, the BJT is enabled. This overload condition can be defined by using Equation 4.

$$I_o > \frac{V_{CE}}{R_{oc}} \qquad \text{Equation 4}$$

$$V_o = \frac{1}{2}(V_{o1} + V_{o2} + V_{CE}) \qquad \text{Equation 5}$$

Thus, when current excessively flows in the output terminal of the feedback circuit, a voltage at the output terminal of the feedback circuit is limited by the BJT, as set forth in Equation 5 above, so that it may be possible to prevent overcurrent from flowing to the input terminal of the load 260

Figure 4:
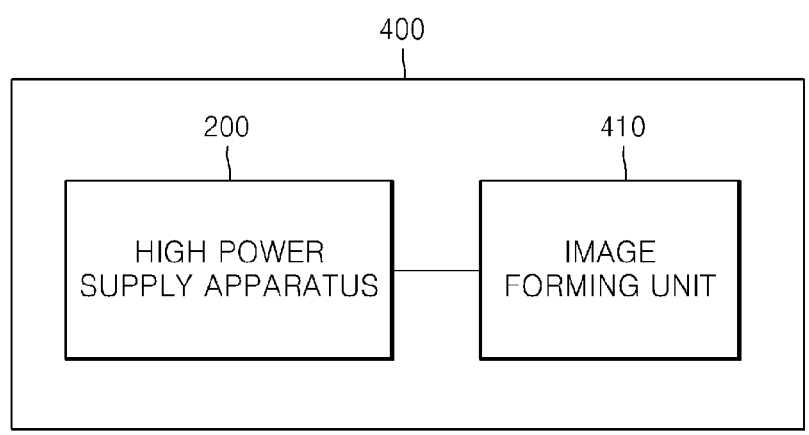
FIG. 4 is a block diagram of an image forming apparatus having a power supply apparatus to supply power to an image forming unit, according to another embodiment of the present general inventive concept.

Thus, as illustrated in FIG. 4, a high power supply apparatus having a remote sensing circuit according to embodiments of the present inventive concept may be used as a power supply apparatus of an image forming apparatus 400. Here, the image forming apparatus 400 may include an image forming unit 410 to form an image and the high power supply apparatus 200 (FIG. 2) that supplies high power to the image forming unit. The image forming apparatus 400 may correspond to the load 260 of FIGS. 1-3. The image forming apparatus 400 generally includes a printer, a scanner, a facsimile, a photocopier, or other known or later developed devices capable of forming an image on paper or other print mediums. In general, the image forming apparatus 400 includes an image forming unit 410 to form an image through image forming processes including charging, exposing, developing, transferring, and fusing processes, and a power supply apparatus 200 to supply power to the image forming unit 410. Also, the high-power supply apparatus according to the example embodiments of the present general inventive concept is not limited to use with an image forming apparatus 400, but may also be used as a power supply apparatus of various other electronic devices.

Although a few example embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A remote sensing circuit of a high-power supply apparatus comprising a feedback circuit to feedback power output from a high-power generating unit to an input terminal of the high-power supply apparatus, the remote sensing circuit comprising:
    a switching unit connected between an output terminal of the high-power generating unit and the feedback circuit of the high-power supply apparatus to open the connection in a normal status and to close the connection in an abnormal status;
    a load channel to connect the high-power generating unit to a load; and
    a remote sensing unit having an input commonly connected to the load and the load channel and an output commonly connected to the switching unit and the feedback circuit to sense power supplied to the load and to generate a feedback signal directly connected between the load channel and the feedback circuit to indicate a feedback voltage to the feedback circuit and the switching unit based on the sensed power.

2. The remote sensing circuit of claim 1, wherein the switching unit comprises a BJT (bipolar junction transistor).

3. The remote sensing circuit of claim 1, wherein the switching unit comprises an FET (field-effect transistor).

4. The remote sensing circuit of claim 1, wherein the load channel is a connecting device having a resistance formed by a connector and a cable to connect the high-power generating unit and the load.

5. A high-power supply apparatus, comprising:
    a high power generating unit;

a feedback circuit unit to feedback power output from the high power generating unit to an input terminal of the high-power supply apparatus;

a switching unit connected between an output terminal of the high power generating unit and the feedback circuit unit to open the connection in a normal status and to close the connection in an abnormal status;

a load channel to connect the high-power supply apparatus to a load; and a remote sensing unit having an input commonly connected to the load and the load channel and an output commonly connected to the switching unit and the feedback circuit unit to sense power supplied to the load and to generate a feedback signal directly connected between the load channel and the feedback circuit to indicate a feedback voltage to the switching unit and the feedback circuit based on the sensed power.

6. The high-power supply apparatus of claim 5, wherein the switching unit comprises an FET (field effect transistor).

7. The high-power supply apparatus of claim 5, wherein the switching unit comprises a BJT (bipolar junction transistor).

8. The high-power supply apparatus of claim 5, wherein the load channel is a connecting device having a resistance formed by a connector and a cable to connect the high-power supply apparatus and the load.

9. An image forming apparatus comprising:
an image forming unit to form an image; and
a high-power supply apparatus to supply high power to the image forming unit,
wherein the high-power supply apparatus comprises:
a high power generating unit;
a feedback circuit unit to feedback power output from the high power generating unit to an input terminal of the high-power supply apparatus;
a switching unit connected between an output terminal of the high power generating unit and the feedback circuit unit to open the connection in a normal status and to close the connection in an abnormal status;
a load channel to connect the high-power supply apparatus to a load; and
a remote sensing unit having an input commonly connected to the load and the load channel, and an output commonly connected to the switching unit and the feedback circuit unit to sense power supplied to the load and to generate a feedback signal directly connected between the load channel and the feedback circuit to indicate a feedback voltage to the switching unit and the feedback circuit based on the power supplied to the load.

10. The image forming apparatus of claim 9, wherein the switching unit comprises a BJT (bipolar junction transistor).

11. The image forming apparatus of claim 9, wherein the switching unit comprises an FET (field effect transistor).

12. The image forming apparatus of claim 9, wherein the load channel is a connecting device having a resistance formed by a connector and a cable to connect the high-power supply apparatus and the load.

13. An electronic device having a power supply to supply power to the electronic device and a sensing circuit to control an over voltage of the power supply, the sensing circuit comprising:
a switching unit connected between an output terminal of the power supply and a feedback input of the power supply to selectively open and close a first connection directly between the output terminal and the feedback input; and
a sensing unit having an input connected to a load channel of the power supply and an output connected to the feedback input of the power supply to sense the power supplied to the load channel and to output a feedback voltage to the switching unit and the feedback circuit,
wherein when an output voltage of the load channel exceeds a predetermined threshold value, the switching unit closes the first connection to reduce the amount of current flowing through the load channel.

14. The electronic device of claim 13, wherein:
the switching unit closes the first connection between the output terminal of the power supply and the feedback input when the output voltage exceeds a predetermined threshold value.

15. The electronic device of claim 13, wherein:
the switching unit closes the first connection when the current flowing through the feedback input of the power supply exceeds a predetermined value.

16. The electronic device of claim 13, wherein:
the switching unit comprises a BJT (bipolar junction transistor) which is enabled when the feedback voltage at the output of the sensing unit is lower than a voltage $V_{CE}$ of the BJT.

17. A method of sensing an over voltage of a power supply, the method comprising:
sensing an output voltage of a load channel of the power supply and generating a feedback signal indicating a feedback voltage based on the output voltage of the load channel; and
switching a connection between an output terminal of the power supply and a feedback input of the power supply to reduce the amount of current flowing through the load channel,
wherein the feedback signal is directly connected to the feedback input, and the connection between the output terminal and the feedback input is closed in response to the sensed output voltage exceeding the feedback voltage at the feedback input.

18. The method of claim 17, wherein:
the connection is closed when an output voltage of the load channel exceeds a predetermined threshold value.

19. The method of claim 17, wherein:
the connection is closed when the current flowing through the feedback input of the power supply exceeds a predetermined value.

20. The method of claim 17, wherein:
the connection comprises a BJT (bipolar junction transistor) which is enabled when a voltage of the feedback input is lower than a voltage $V_{CE}$ of the BJT.

* * * * *